(12) United States Patent
Rosen (10) Patent No.: US 7,459,880 B1
(45) Date of Patent: Dec. 2, 2008

(54) SOLAR GENERATOR PANEL FOR AN ELECTRIC OR HYBRID VEHICLE

(76) Inventor: George Michel Rosen, 4374 Turner Ave., Oakland, CA (US) 94605

( * ) Notice: Subject to any disclaimer, the term of this patent is extended or adjusted under 35 U.S.C. 154(b) by 0 days.

(21) Appl. No.: 11/492,507

(22) Filed: Jul. 24, 2006

(51) Int. Cl.
*H01M 10/46* (2006.01)

(52) U.S. Cl. ...................................... 320/101

(58) Field of Classification Search ............ 320/101, 320/104, 107, 114; 136/244, 291, 292
See application file for complete search history.

(56) References Cited

U.S. PATENT DOCUMENTS 5,518,205 A * 5/1996 Wurst et al. ............... 136/291
6,448,740 B1 * 9/2002 Kirkpatrick ................ 320/101
6,581,883 B2 * 6/2003 McGee et al. .............. 136/245
2006/0118162 A1 * 6/2006 Saelzer et al. .............. 136/246

* cited by examiner

*Primary Examiner*—Edward Tso
(74) *Attorney, Agent, or Firm*—Risto A. Rinne, Jr.

(57) ABSTRACT

An apparatus for charging a battery of a vehicle includes at least one photovoltaic cell that is adapted to convert solar insolation into electricity. The position of each photovoltaic cell is varied so that it faces toward a current location of the sun whether the vehicle is stationary or moving whenever the sun is visible. The apparatus is preferably disposed in a spoiler. The spoiler is either permanently attached to or is detachably-attachable with respect to the vehicle. The spoiler helps improve stability and handling at higher vehicle speeds as well as providing for the supplemental charging of the battery. The spoiler adds to the aesthetic appeal of the vehicle while helping to camouflage its primary purpose as that of a solar charging device.

12 Claims, 3 Drawing Sheets

SOLAR GENERATOR PANEL FOR AN ELECTRIC OR HYBRID VEHICLE

BACKGROUND OF THE INVENTION

1. Field of the Invention

The present invention, in general, relates to solar power and, more particularly, to a solar power-assisted vehicle.

Electric vehicles are known as are hybrid gasoline and electric types of vehicles.

Whenever a vehicle receives some or all of its power from electricity, the issues of storage of electrical charge and replenishment of the electrical charge arise.

There is a need to charge a vehicle's battery or batteries (whether electric or otherwise) when the vehicle is moving or stationary.

Currently, an alternator (or generator) is typically used (whenever an internal combustion engine is used) to supply the required charging current to replenish the electrical charge in the storage battery or batteries. However, it takes energy from the engine to charge the vehicle's batteries.

This decreases fuel economy for hybrid vehicles and maximum range for electric vehicles, which are generally unable to be charged while in motion other than perhaps from a relatively small amount of electrical energy that is extracted during braking. Charging the batteries of a hybrid vehicle without using gasoline to do so would also help to extend its maximum range.

Solar panels are also known. However, solar panels are aesthetically unappealing. The importance of aesthetics when it comes to the appearance of a vehicle cannot be overstated. People invest many thousands of dollars more because they prefer the aesthetics of one vehicle over that of another vehicle. They do this even when the more expensive vehicle has a much poorer reliability record or is known to be more costly to maintain.

Appearance is one of the most important determinants that influences the selection and purchase of a vehicle, whether it is electric, hybrid, or of internal combustion design.

People have long known that solar panels could be placed on the hood, trunk, or roof areas, yet they have refrained from doing so for two primary reasons, one of which is the generally unappealing aesthetic impact such placement of a solar panel would invoke.

Furthermore, they do not align with a solar source (i.e., the sun) and, as such, provide limited efficiency. This is a second significant reason that has hindered the use of solar to electric energy generation for vehicles.

Additionally, when a vehicle is parked for an extended period of time, the position of the sun is constantly changing. Accordingly, even a solar panel would not supply optimum charge current to a stationary vehicle over a protracted period of time.

This problem is compounded by the low position of the sun during times of sunrise and sunset. At or near these periods of time, a solar panel is not receiving much if any solar energy. Therefore, charging cannot possibly occur until the sun is high in the sky.

This, therefore, means that less time is available for charging a flat solar panel than the sun is actually visible and providing solar energy (radiation) or insolation.

Another important consideration is aerodynamic drag or the coefficient of aerodynamic friction that affects every moving vehicle. Ideally, designers want vehicles to be as slippery as possibly when moving on the surface and passing through the air in order to reduce drag and, therefore, optimize fuel economy. This is becoming an even more important consideration.

Additionally, there are many hybrids and a fair number of electric vehicles that presently do not have a method of charging the vehicle's battery or batteries by solar means.

Ideally, an add-on device can be retrofitted to existing vehicles is desirable.

If the add-on device were aesthetically appealing or at least neutral, that would be preferred.

If the add-on device caused a minimal increase in vehicle drag, that would also be preferred.

If the add-on device could increase vehicle traction at higher speeds or vehicle stability at higher speeds, that would also be preferred.

If the add-on device maximized the charging efficiency of whatever photovoltaic source is used, that would also be preferred.

Additionally, the ability to convert solar insolation into an electrical potential (voltage and current) sufficient to charge a battery (or batteries) is dependent on several factors for any given geographical area.

As discussed above, orienting the solar collector(s) (i.e., the photovoltaic cells) so that they are normal to the sun is an important determinant to efficiency.

Certainly, the internal design of the photovoltaic cells is also important.

Another important determinant to the magnitude of charge current is collector area for this determines the amount of solar insolation that impinges on the photovoltaic cells. Basically, this means that the greater the collector area (i.e., the more photovoltaic cells), the greater the ability to generate electricity.

Therefore, it is desirable to provide the capability to expand collector area in the future.

All of the above-mentioned needs and preferences for an add-on device that can be retrofitted for use with an existing vehicle also apply to such use in new vehicle design.

Additionally, there has been no effective way to charge a moving vehicle because the position of the sun is frequently changing with respect to the vehicle. Accordingly, any photovoltaic cells are likely to be directed away from the sun a significant portion of the time.

Accordingly, there exists today a need for a solar generator for an electric or a hybrid vehicle that helps ameliorate the above-mentioned problems and other problems and difficulties not yet mentioned.

Clearly, such an apparatus would be a useful and desirable device.

2. Description of Prior Art

Solar panels and charging systems are, in general, known. While the structural arrangements of the above described and known devices may, at first appearance, have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a solar generator for an electric or a hybrid vehicle that is aesthetically pleasing.

It is also an important object of the invention to provide a solar generator for an electric or a hybrid vehicle that can be used to supply an electrical charge to a storage battery or to a plurality of storage batteries.

Another object of the invention is to provide a solar generator for an electric or a hybrid vehicle that is able to improve aerodynamic efficiency of the vehicle.

Still another object of the invention is to provide a solar generator for an electric or a hybrid vehicle that minimizes an amount of aerodynamic drag that is experienced by the vehicle.

Still yet another object of the invention is to provide a solar generator for an electric or a hybrid vehicle that improves the fuel economy of a vehicle.

Yet another important object of the invention is to provide a solar generator for an electric or a hybrid vehicle that can improve the maximum range of a vehicle.

Still yet another important object of the invention is to provide a solar generator for an electric or a hybrid vehicle that can help charge a storage battery while the vehicle is stationary.

A first continuing object of the invention is to provide a solar generator for an electric or a hybrid vehicle that can help charge a storage battery while the vehicle is in motion.

A second continuing object of the invention is to provide a solar generator for an electric or a hybrid vehicle that can extend the amount of time during a day that is available for charging a vehicle's battery.

A third continuing object of the invention is to provide a solar generator for an electric or a hybrid vehicle that can enable a photovoltaic cell to begin charging a vehicle's battery earlier in the morning than with previous designs.

A fourth continuing object of the invention is to provide a solar generator for an electric or a hybrid vehicle that can enable a photovoltaic cell to continue charging a vehicle's battery later into the evening than with previous designs.

A fifth continuing object of the invention is to provide a solar generator for an electric or a hybrid vehicle that can increase the charging efficiency for an extended period of time for a stationary vehicle.

A sixth continuing object of the invention is to provide a solar generator for an electric or a hybrid vehicle that can increase the charging efficiency for an extended period of time for a moving vehicle.

A seventh continuing object of the invention is to provide a solar generator for an electric or a hybrid vehicle that is adapted to determine the position of the sun in the sky.

An eighth continuing object of the invention is to provide a solar generator for an electric or a hybrid vehicle that is adapted to determine the position of the sun in the sky anywhere within a hemisphere.

A ninth continuing object of the invention is to provide a solar generator for an electric or a hybrid vehicle that is adapted to orient a photovoltaic device towards the sun.

A tenth continuing object of the invention is to provide a solar generator for an electric or a hybrid vehicle that includes means for orienting a photovoltaic cell into a position that is normal with respect to the sun.

An eleventh continuing object of the invention is to provide a solar generator for an electric or a hybrid vehicle that includes a dome shaped device for determining the position of the sun.

A twelfth continuing object of the invention is to provide a solar generator for an electric or a hybrid vehicle that includes one or more photovoltaic devices that are disposed on a spoiler, the spoiler being adapted for attachment to the vehicle.

A thirteenth continuing object of the invention is to provide a solar generator for an electric or a hybrid vehicle that can be expanded to increase the area of photovoltaic coverage.

A fourteenth continuing object of the invention is to provide a solar generator for an electric or a hybrid vehicle that can be retrofitted for use with existing types of vehicles.

A fifteenth continuing object of the invention is to provide a solar generator for an electric or a hybrid vehicle that can be used with new design vehicles.

A sixteenth continuing object of the invention is to provide a solar generator for an electric or a hybrid vehicle that is economical to manufacture.

A seventeenth continuing object of the invention is to provide a solar generator for an electric or a hybrid vehicle that is easy to install on new vehicles.

An eighteenth continuing object of the invention is to provide a solar generator for an electric or a hybrid vehicle that is easy to install and retrofit for use on existing vehicles.

A nineteenth continuing object of the invention is to provide a solar generator for an electric or a hybrid vehicle that includes a simple, yet rugged, mechanism for determining the position of the sun in the sky.

A twentieth continuing object of the invention is to provide a solar generator for an electric or a hybrid vehicle that is reliable.

A twenty-first continuing object of the invention is to provide a solar generator for an electric or a hybrid vehicle that is able to improve the efficiency of a photovoltaic cell at producing electricity.

Briefly, a solar generator for an electric or a hybrid vehicle that is constructed in accordance with the principles of the present invention has an apparatus for determining the position of the sun in the sky and at least one photovoltaic cell that is adapted to convert solar insolation into electricity. The orientation of the photovoltaic cell is varied so that it remains normal with respect to a position of the sun whether the vehicle is stationary or moving. Preferably, the apparatus for determining the position of the sun and also preferably a plurality of the photovoltaic cells are disposed on a spoiler that is either permanently attached to or which is detachably-attachable with respect to the vehicle. Accordingly, the benefits of a spoiler which include improved stability at higher speeds and improved handling at higher speeds are provided as well as the benefit of solar charging. The spoiler provides a minimum increase in drag and for certain vehicles can improve (i.e., lessen) drag. The spoiler also effectively hides its primary purpose as a solar charging device. The spoiler can be attached over the trunk, roof, or where desired. If preferred, additional solar panels can be added to increase capacity of the system.

DETAILED DESCRIPTION OF THE INVENTION

Figure 1:
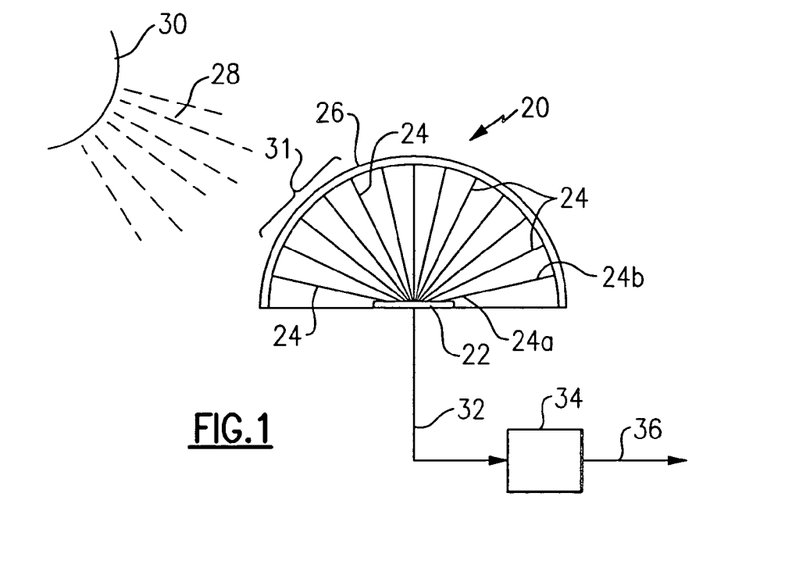
FIG. 1 is a cross-sectional view from the side of a dome sensor for use with the solar generator for an electric or a hybrid vehicle.

Referring to FIG. 1 is shown, a cross-sectional view of a dome sensor, identified in general by the reference numeral 20. The dome sensor 20 is used to determine the position of the sun anywhere within a hemispherical view.

A photo-transistor array 22 is disposed at the bottom of the dome sensor 20. The photo-transistor array 22 includes a plurality of phototransistors that are placed side by side in a matrix or array pattern.

A plurality of fiber optic strands 24 are disposed at a first end of each strand 24a immediately above the photo-transistor array 22. An opposite end of each of the plurality of strands 24b is disposed adjacent to an outside globe 26.

The globe 26 includes a shape that approximates one-half of a sphere, or as a hemisphere. The globe 26 is formed of any preferred material that is able to allow at least a portion (i.e., some wavelength or band of wavelengths) of solar radiation 28 being emitted by the sun 30 to pass through the globe 26.

A portion of the solar radiation 28 (i.e., sunlight) that passes through the globe 26 enters into some of the fiber optic strands 24 that are facing toward the sun 30. A first group of fiber optic strands 24 that is receiving light from the sun 30 (solar radiation 28) is identified, in general, by bracket 31 and which will be discussed in greater detail, hereinafter.

It is important to understand that the plurality of fiber optic strands 24 are precisely arranged at the second ends 24b thereof to provide a presence that is sufficient throughout an interior of the globe 26.

Accordingly, if the sun 30 is anywhere above the horizon, in other words if the sun 30 has risen, and no object is blocking the view of the dome 26 (between the sun 30 and the dome 26), then some of the plurality of fiber optic strands 24 will be able to receive the radiation 28 sufficient to later determine where the sun 30 is located with respect to the phototransistor array 22, and therefore with respect to the current position of the dome 26.

The phototransistor array 22, as is described in greater detail hereinafter, is able to provide a composite input signal 32 to a microcomputer 34. The microcomputer 34 averages the incident radiation 28 that impinges on the phototransistor array 22 to determine a location of the sun 30 relative to the dome 26 at any given instant. The microprocessor 34 emits an output signal 36 that is indicative of the position of the sun 30 relative to the position of the dome 26 at that time.

Figure 2:
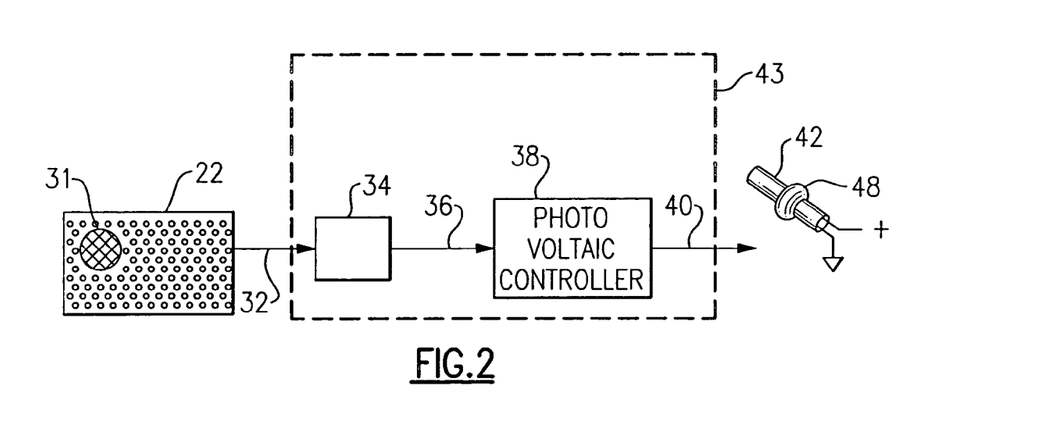
FIG. 2 is a block diagrammatic view of the relationships between morning sunlight striking a phototransistor array of the dome sensor of FIG. 1, a microprocessor, a photovoltaic position controller, and a photovoltaic device.

Referring now also to FIG. 2, is shown, the phototransistor array 22 along with an indication of the light output from the first group of fiber optic strands 24. The fiber optic strands 24 included in the bracket 31 comprise a circular pattern of incident solar radiation 28. Accordingly, bracket 31 really includes a circular shape and can also be referred to herein as circle 31. This light output is impinging (i.e., striking) a particular area of the phototransistor array 22, as shown by circle 31.

This is because in the FIG. 1 cross-sectional view, bracket 31 did not show the full extent of the fiber optic strands 24 (or filaments) that would actually be receiving some of the solar radiation 28. The circle 31, as shown in FIG. 2, is more representative of the total amount, location, and shape of the pattern of solar radiation 28 that is striking the phototransistor array 22.

The light from the sun 30 that impinges on a surface is also referred to as "solar insolation". Accordingly, circle 31 represents the solar insolation pattern that is impinging on the phototransistor array 22 at that moment. As the sun 30 moves in the sky (assuming the dome 26 remains stationary), the position of the circle 31 will of course move over the surface of the phototransistor array 22 to reflect that movement.

Similarly, if the position of the dome 26 were to move relative to the position of the sun 30, the position of the circle 31 will similarly move over the surface of the phototransistor array 22.

The phototransistor array 22 is shown as being rectangular in shape. However, the phototransistor array 22 can include any preferred shape. The shape of the phototransistor array 22 is not significant. What is significant is the position of the circle 31 relative to the phototransistor array 22.

The circle 31 represents those fiber optic filaments (strands) that are receiving a substantive amount of the solar radiation 28. There may be some additional minimal solar radiation (i.e., solar insolation) that is being received by other fiber optic strands 24 and therefore also impinging on other areas of the phototransistor array 22, however, this is minimal and generally insignificant.

A sufficient quantity of the fiber optic filaments (strands) 24 are provided to virtually cover all of the phototransistor array 22 at the first end of the fiber optic strands 24. This ensures that ambient light will not impinge on the phototransistor array 22 to any appreciable degree that could confuse detection of the direction of the sun 30. It also ensures that any of the solar radiation 28 not passing through the plurality of fiber optic strands 24 will not impinge significantly on the phototransistor array 22 and possibly confuse determination of the direction of the sun 30.

The input signal 32 to the microprocessor 34, as mentioned above is a composite signal. That means it includes information about which individual phototransistors that comprise the plurality of phototransistors in the phototransistor array 22 are receiving solar insolation, as shown by circle 31. Each of the phototransistors that comprise the phototransistor array 22 is assigned an address along with an X-Y coordinate by the microprocessor 34. Each of the fiber optic strands 24 is carefully located at both ends thereof. Accordingly, which transistors of the phototransistor array 22 are energized (i.e., which ones are receiving light energy) are indicative of the position of the sun 30 relative to the dome 26.

The microprocessor 34 averages the incident energy to determine a center of the circle 31. The output signal 36 is indicative of the center of the circle 31 at any given time. The output signal 36 is expected to provide constant or frequent periodic updates as to the position of the sun 30 to a photovoltaic positional controller, identified in general by the reference numeral 38.

Although the output signal 36 can be encoded as desired, the basic information it contains must be sufficient to point to the sun 30 in space relative to the location and position of the dome 26.

While the essential information of the output signal 36 can be encoded in a variety of ways, as desired, astronomers, for example, currently prefer to point to objects in space (understanding that the view from any position on earth also approximates looking upward at the inside of a hemisphere) by providing an azimuth coordinate and an elevation coordinate. This essential information is included as part of the output signal 36 and is provided in a form that the photovoltaic positional controller 38 can utilize.

The photovoltaic positional controller 38 uses the data in the output signal 36 to provide a second X-Y control signal 40 that is used to tilt (i.e., position) a photovoltaic device 42 (or preferably a plurality thereof) along an X-Y axis. Accordingly, the photovoltaic device 42 is tilted on two axes by the photovoltaic positional controller 38 so as to point directly at the sun 30.

The photovoltaic positional controller 38 can, if preferred, include circuitry that decodes the input signal 36 sufficient to provide the second X-Y control signal 40. Alternately, the photovoltaic positional controller 38 can include a second microprocessor (not shown) or it can share and rely on the processing ability of the microprocessor 34 to decode the output signal 36 and generate the second X-Y control signal 40.

If the microprocessor 34 is also used to provide the functional equivalent of the photovoltaic positional controller 38, then both functions can be performed by the same hardware and software, as shown by dashed line 43 (FIG. 2 only).

Figure 4:
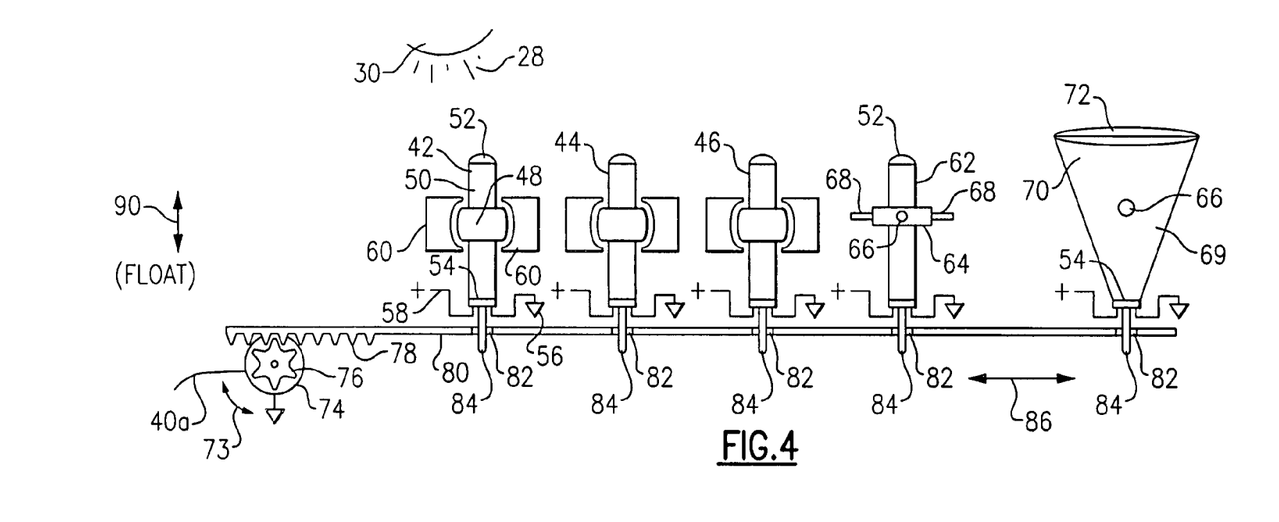
FIG. 4 is a side view of a drive mechanism for tilting the photovoltaic device(s) of FIG. 2 along the X axis.

Referring now momentarily to FIG. 4, a detailed view of how the photovoltaic device 42 is tilted along an X axis is shown. The second X-Y control signal 40 provides a first output 40*a* and a second output 40*b* (FIG. 5), the first output 40*a* controlling movement (i.e., tilting) of the photovoltaic device 42 along the X axis and the second output 40*b* controlling movement (i.e., tilting) of the photovoltaic device 42 along the Y axis, both of which are occurring simultaneously, and either constantly or periodically, as desired.

Motion along the Y axis is accomplished in a similar manner to that along the X axis and is described immediately following the description of motion along the X axis.

While many ways are possible to direct the positioning of the photovoltaic device 42, one preferred way is described herein. A second photovoltaic device 44 and a third photovoltaic device 46 are also shown to illustrate that a plurality are expected to be used.

A partial ball 48 is attached along a longitudinal length of a tube 50 of the photovoltaic device 42. A lens 52 is preferably disposed at an end of the tube 50 that is closest to the sun 30. The lens 52 directs incident light (28) through the tube and onto an actual photovoltaic cell 54 (or plurality thereof) that is disposed at an opposite end of the tube 50.

The photovoltaic cell 54 includes any type of device that is capable of converting solar insolation (i.e., the 28 that actually impinges on the photovoltaic cell 54) into electricity in terms of either a voltage differential (i.e., a potential) or a current flow. As shown, a ground output 56 and a positive voltage output 58 are provided by the photovoltaic cell 54. The ground and positive voltage outputs 56, 58 of the plurality of photovoltaic devices 42, 44, 46 (and others, not shown) can be arranged in parallel or in series or a combination thereof, as preferred.

Each partial ball 48 is disposed in a support structure 60. Each support structure 60 is attached to a surrounding frame structure (not shown) that supports all component parts.

Each support structure 60 includes a spherical shaped recess that contains the partial ball 48 and which allows movement of the partial ball 48 therein a limit amount about a point in any direction. Ideally, the support structure 60 provides minimal limitation and allows each photovoltaic device to be disposed from as close to horizontal in any direction to as close to horizontal in the opposite direction.

Accordingly, the photovoltaic devices are adapted to tilt about both an X and a Y axis.

Referring now momentarily to a modified photovoltaic device 62 that is attached to a modified support structure 64 by a first pair of pins 66 (only one is shown) and which allow the modified photovoltaic device 62 to tilt about the X axis. The modified support structure 64 includes a second pair of pins 68 that permit the modified support structure 64, and therefore also the modified photovoltaic device 62, to tilt about a Y axis. The second pair of pins 68 enter into a second modified support structure (not shown) and pivot therein. The second modified support structure is attached to the frame.

The modified photovoltaic device 62 is included to illustrate that various ways of mounting the photovoltaic devices 42, 44, 46 and the modified photovoltaic device 62 sufficient to tilt them in any direction are possible.

It is also important to note that the tube 50 portion does not have to be cylindrical in shape. If preferred, a modified tube 69 could be conical in shape as shown in a second modified photovoltaic device 70 with the portion closest to the sun 30 having the largest diameter. A modified lens 72 would similarly be increased in size and modified so as to direct all of the incident radiation 28 onto the smaller sized photovoltaic cell 54 disposed at an opposite end of the modified tube 69.

The advantage to this possible configuration is that solar insolation collector area can be maximized (for each photovoltaic device) without having to increase the number of photovoltaic cells 54 in order to have a photovoltaic collector area that is equal to the that of the solar insolation collector area. In other words, a smaller overall area of the photovoltaic cells 54 can be used than that of the modified lenses 72.

This provides two primary benefits. It increases the amount of available energy (solar insolation) because of a larger collector area (which is equal to the area of the modified lens 72). This, in turn, increases the amount of electricity being produced by the ground and positive outputs 56, 58 of the photovoltaic cell 54.

This configuration also helps improve overall system efficiency by allowing the photovoltaic cell 54 to pass beyond a minimum threshold of solar insolation that is required for it to produce electricity for a greater period of time each day. By focusing the solar radiation 28 onto the photovoltaic cell 54 by the modified lens 72, it is able to produce usable electricity before the sun 30, itself, has risen sufficiently high in the sky to do so with a smaller collector area.

The same is true in the evening in that electricity will continue to be produced by the photovoltaic cell 54 of the second modified photovoltaic device 70 when the sun has descended lower in the horizon than would otherwise be possible. The same is true with overcast and other conditions that reduce the intensity of the solar radiation 28. As a result, efficiency of the photovoltaic cell 54 of the second modified photovoltaic device 70 is improved.

The first output 40*a* is used to actuate in either direction (as shown by arrow 73) a first motor 74 which drives a first gear 76 a predetermined amount in either direction. The first gear 76 drives a linear gear 78 (i.e., a rack gear) that is attached to a first member 80. The first member includes a plurality of spaced-apart openings 82 therein.

A protruding rod 84 extends downward from a bottom of each of the photovoltaic devices 42, 44, 46, 62, 70. Each protruding rod 84 passes through one of the spaced-apart openings 82 and includes sufficient tolerance to allow for tilting of the protruding rod 84 therein away from normal.

Accordingly, motion of the first gear 76 displaces the first member 80 left to right and back as shown by arrow 86. This represents movement along the X axis.

The first member 80 is increased in size to simultaneously tilt (move) a plurality of banks (i.e., parallel rows, not shown) of the photovoltaic devices 42, 44, 46, or the first modified photovoltaic devices 62, or the second modified photovoltaic devices 70, or a combination thereof, as desired. To tilt a plurality of banks of the photovoltaic devices 42, the first member is modified so as to include structure similar to that of a second member 88, as is described in greater detail hereinbelow.

Figure 5:
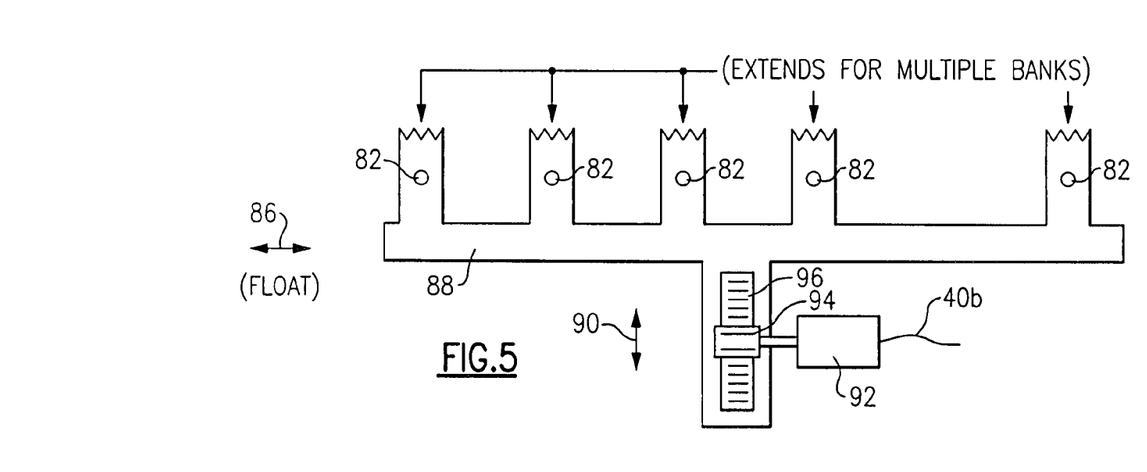
FIG. 5 is a plan (top) view of a drive mechanism for tilting the photovoltaic device(s) of FIG. 2 along the Y axis.

Referring also to FIG. 5, the second output 40b is used to actuate in either direction (as shown by arrow 90) a second motor 92 which drives a second gear 94 a predetermined amount in either direction. The second gear 94 drives a second linear gear 96 (i.e., also a rack gear) that is attached to the second member 88.

The second member 88 also includes the plurality of spaced-apart openings 82 therein that align with the spaced-apart openings 82 of the first member 80.

The second member 88 is disposed under the first member 80. All of the protruding rods 84 also pass through the corresponding spaced-apart openings 82 of the second member.

Accordingly, the second output 40b is used to urge the second member 88 a predetermined amount in the direction as shown by arrow 90. This is movement along the Y axis.

The second member 88 and the second motor 92 control motion along the Y axis and "float" along the X axis. In other words, the second member 88 and the second motor 92 are able to move freely in the direction as shown by arrow 86.

Similarly, the first motor 74 and the first member 80 control motion along the X axis and "float" along the Y axis. In other words, the first member 80 and the first motor 74 are able to move freely in the direction as shown by arrow 90.

If preferred, each of the spaced-apart openings 82 of the first member 80 could be replaced with first slots (not shown). The first slots would each be parallel with arrow 90. This would allow the first member 80 to direct movement of the protruding members 84 along the X axis but would allow tolerance along the longitudinal length of the first slots for positional control by second member 88 along the Y axis.

Similarly, each of the spaced-apart openings 82 of the second member 88 could be replaced with second slots (not shown). The second slots would each be parallel with arrow 86. This would allow the second member 88 to direct movement of the protruding members 84 along the Y axis but would allow tolerance along the longitudinal length of the second slots for positional control by first member 80 along the X axis.

The first output 40a and the second output 40b along with the first member 80 and the second member 88 are used to tilt all of the photovoltaic devices 42, 44, 46, 62, 70 along both an X and a Y axis sufficient to simultaneously point all of them in any desired direction in space.

All of the photovoltaic devices 42, 44, 46, 62, 70 are preferably parallel and are all urged in unison. Therefore, they all point in the same direction.

Figure 3:
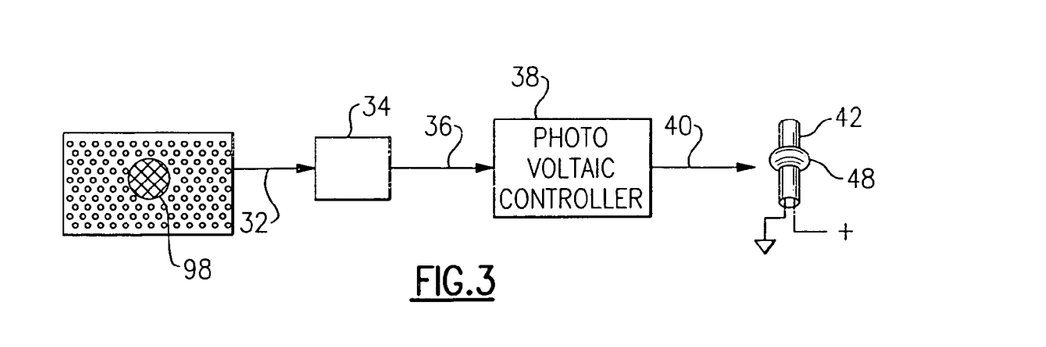
FIG. 3 is a block diagrammatic view of the relationships between noon sunlight striking the phototransistor array of the dome sensor, the microprocessor, the photovoltaic position controller, and the photovoltaic device of FIG. 2.

Referring back to FIG. 2 and now also to FIG. 3, which is similar to FIG. 2 except that a second circle 98 is shown on the phototransistor array 22 at a different location than the circle 31. Also according to FIG. 3, the photovoltaic device is pointing more vertical than in FIG. 2.

Let us assume that circle 31 of FIG. 2 represents the sun rising at a particular direction relative to the dome 26. The second X-Y control signal 40 of the photovoltaic positional controller 38 has been used continuously to track the position of the sun 30 and to ensure that at any given moment the photovoltaic device 42 has been pointing directly toward sun 30.

Let us assume that second circle 98 of FIG. 3 represents a position of the sun around noon, high in the sky, taken some hours after that of FIG. 2. The second X-Y control signal 40 of the photovoltaic positional controller 38 has been used to point the photovoltaic device 42 toward the early morning sun 30.

At this time (in accordance with FIG. 3), the sun 30 is nearly overhead and the photovoltaic device 42 has been urged about both the X and the y axis an amount sufficient so that it continues pointing toward the sun 30, which now has become the noon sun 30. Throughout the day, as the sun 30 moves relative to the dome 26, so does the dome sensor 20 continually track the position of the sun 30, and in response thereto, so does the photovoltaic device 42 (i.e., the photovoltaic devices 42, 44, 46, 62, 70) continually move and point toward the sun 30. Thereby, the production of electricity and overall efficiency of the photovoltaic device 42 is optimized throughout the day.

It has been shown how the photovoltaic devices 42, 44, 46, 62, 70 track the position of the sun 30 as it changes relative to the dome 26. It does not matter if the relative change in motion is caused by the dome 26 being stationary or if the dome 26 is quickly moving while the sun 30 remains relatively stationary or both. The same system, as described herein allows tracking of the position of the sun 30 relative to the dome 26 and continual correction of the position of the photovoltaic devices 42, 44, 46, 62, 70 to ensure that they each always point toward the sun. This allows placement of the dome sensor 20 and of the photovoltaic devices 42, 44, 46, 62, 70 on either stationary or on moving objects. The latter is described in greater detail hereinbelow.

Figure 6:
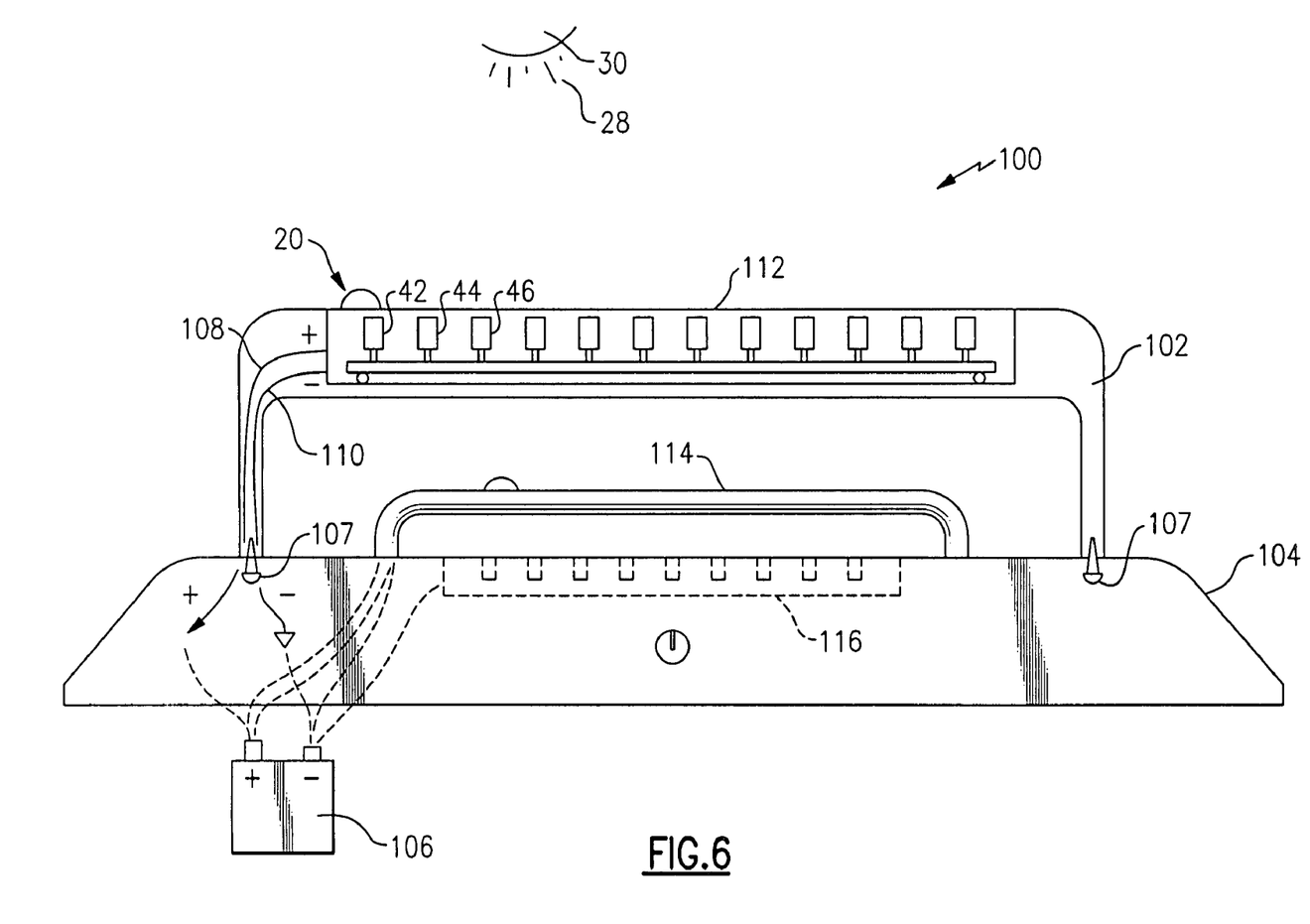
FIG. 6 is a side view of a trunk of a vehicle and including a cross-sectional view of a spoiler that is mounted to the trunk.

Referring now to FIG. 6, is shown, a spoiler 102 (in cross-sectional view thereof) attached to and disposed over a trunk 104 of a motor vehicle. Only the spoiler 102 is shown in cross-sectional view. The remainder includes a side view and certain components that are hidden from view in dashed lines.

While the vehicle can include any type of vehicle, a preferred type includes an electric or hybrid type of vehicle.

A solar generator for an electric or a hybrid vehicle, as shown in general by reference numeral 100, is attached to the spoiler 102. This type of attachment provides many benefits as are described in greater detail hereinafter.

When all of the component parts (20-98) as described hereinabove (or their functional equivalent) are included as part of a system that is attached to the vehicle (anywhere desired) and which is adapted to charge a storage battery 106 (dashed lines) or a plurality of storage batteries, a version of the solar generator for an electric or a hybrid vehicle 100 is provided. When the spoiler 102 is used to house these component parts, a preferred version thereof is provided.

The spoiler 102 is secured to the trunk 104 of the vehicle by screws 107 or by any other preferred method, for example the use of an adhesive.

The spoiler 102 includes a positive wire 108 and a negative wire 110 that pass out of a hole provided in a bottom of the spoiler 102 and an aligning hole that is provided in the trunk 104 and eventually make electrical contact with a positive and negative terminal of the battery 106, either directly, or though other wires or the chassis of the vehicle, as preferred.

The battery 106 that is being recharged by the solar generator for an electric or a hybrid vehicle 100 can include the normal 12 VDC battery used to start and operate the vehicle or it can include any and all batteries that are used to supply motive power for hybrid and electric vehicles.

Accordingly, power from the battery 106 is available to operate the first and second motors 74, 92 of the solar generator for an electric or a hybrid vehicle 100 and supply power for the dome sensor 20, the microprocessor 34, and other component parts thereof.

When the sun is visible and the solar generator for an electric or a hybrid vehicle 100 is operating, it is supplying a greater amount of electrical energy than it is using and therefore the direction of current flow occurring through the positive and negative wires 108, 110 are reversed during charging.

Obviously, if the sun has set and no portion of the phototransistor array 22 is receiving any solar insolation (i.e., solar radiation 28), the system will be in an off or quiescent mode where very little electrical energy is being used by the solar generator for an electric or a hybrid vehicle 100.

As shown in FIG. 6, the sun 30 is overhead and the dome sensor 20 has provided an indication of the sun's position relative thereto. The microprocessor 34 and the photovoltaic positional controller 38 have energized the first and second motors 74, 92 sufficient to urge the first member 80 and the second member 88 into position so that all of the photovoltaic devices 42, 44, 46 (and others) are pointing directly toward the sun 30. Accordingly, the solar generator for an electric or a hybrid vehicle 100 is producing electricity and is charging the battery 106.

As the vehicle is driven, the position of the sun 30 relative to the dome sensor 20 will be constantly changing both in direction (bearing) and elevation as the vehicle tilts forward and backward and as the sun 30 continues its relentless progression through the sky. All the while the solar generator for an electric or a hybrid vehicle 100 is continually (i.e., periodically as fast as the processing time allows) providing a signal to the motors 74, 92 to maintain the photovoltaic devices 42, 44, 46 pointing toward the sun 30.

Accordingly, even while the vehicle is being driven the solar generator for an electric or a hybrid vehicle 100 is able to charge its batteries. As long as the sun 30 is visible and of sufficient intensity the solar generator for an electric or a hybrid vehicle 100 will be charging the battery 106. Of course, if the battery 106 (or batteries) are fully charged, the solar generator for an electric or a hybrid vehicle 100 will be maintaining their charge at full.

This provides maximum efficiency of charge whether the vehicle is stationary or being driven.

The spoiler 102 acts as an airfoil that applies slight downward pressure at speed. Accordingly, high speed handling and stability of the vehicle are improved.

The spoiler 102 also presents a minimum increase in wind resistance or drag. Depending on the particular vehicle that the spoiler 102 is being installed, the height of the spoiler 102 above the trunk 104 can be varied to optimize airflow off of the roof (not shown) of the vehicle.

Accordingly, the use of the spoiler 102 may actually improve airflow at speed and improve the ballistic coefficient of friction of the vehicle sufficient to reduce its drag at speed and, therefore, improve its highway fuel economy.

Because the dome sensor 20 is the only part of the solar generator for an electric or a hybrid vehicle 100 that protrudes above the surface and therefore offers any increase to drag, it (the dome sensor 20) can be made very small in actual size.

Furthermore, the spoiler 102 provides an unexpected benefit in that it improves the aesthetic appearance of the vehicle because it does not look like a solar battery charging system. Except for a glass or plastic panel 112 on the surface to allow the solar radiation 28 to pass through, the spoiler 102 looks like a conventional type of non-charging automotive spoiler (not shown).

Accordingly, users do not have to sacrifice or compromise the appearance of their vehicles but can actually add to appearance by adding the solar generator for an electric or a hybrid vehicle 100.

Additionally, the spoiler 102 is expected to be colored to match or well-contrast with the colors or accent colors of the vehicle.

Also, because the photovoltaic devices 42-46, 62, 70 track the sun, efficiency is increased. This provides the same or even a greater charge capacity from a smaller collector area than is possible with other prior art devices. This allows for a smaller embodiment of the solar generator for an electric or a hybrid vehicle 100 to achieve a comparable rate of charge.

Accordingly, visual impact caused by the solar generator for an electric or a hybrid vehicle 100 is minimized, as are drag (wind resistance) while aesthetics are preserved or improved.

In general, the practical application of solar assisted charging of the battery 106 or batteries of a vehicle is provided. Such application will produce additional pollution-free energy while helping to save precious fossil-fuel preserves.

If preferred a second functional spoiler 114 can be attached elsewhere to the trunk 104 or, if preferred, to the roof or elsewhere on the vehicle to provide an increased collector area of photovoltaic devices 42-46, 62, 70 as desired, and therefore increase the charging capacity of the solar generator for an electric or a hybrid vehicle 100.

The second functional spoiler 114 would be functionally identical to the spoiler 102 that is used with the solar generator for an electric or a hybrid vehicle 100, except that it could have either a larger or smaller collector area (i.e., either a larger or smaller effective collector area of the photovoltaic devices 42-46, 62, 70). The second functional spoiler 114 would also be typically wired in parallel, or if preferred, in series with the solar generator for an electric or a hybrid vehicle 100.

The second functional spoiler 114 also illustrates that heights and widths other than shown on the spoiler 102 are possible.

If desired to increase charge capacity, a convention prior art type of solar panel 116 (i.e., one that is comprised of stationary photovoltaic cells) could be used in addition to the second functional spoiler 114 or in place of it. Because it would not be able to track the sun 30, it would be less efficient than the spoiler 102 or the second functional spoiler 114 as have been disclosed herein, yet it is mentioned as a possible low cost addition to further increase capacity that can be used with the solar generator for an electric or a hybrid vehicle 100.

If the prior art type of solar panel 116 is used, it could be partially or totally recessed below the surface of the trunk 104 (as shown) or located elsewhere so that its top surface is preferably flush with the surface of the trunk 104 or it can be added on top of the trunk 104, as desired. It would be wired in parallel or series with the solar generator for an electric or a hybrid vehicle 100 to increase charging capacity of the system.

There are of course many ways to calibrate the solar generator for an electric or a hybrid vehicle 100. The end user need not do that, unless desired, for it can be accomplished at the factory.

If calibration occurs at the factory, preferably a collimated source of illumination (not shown) that approximates the effects of the sun can be directed at a specific location on the dome 26 for a period of time. This will illuminate and therefore energize a particular group of the phototransistors in the phototransistor array 22.

During calibration mode (either at the factory or after installation) the microprocessor 34 directs the photovoltaic positional controller to sweep the photovoltaic cells 42-46, 62, 70 until they are producing the greatest rate of charge possible. A correlation is then made in memory of the microprocessor 34 between the optimum position for the photovoltaic cells 42-46, 62, 70 and the area of the phototransistor array 22 that is illuminated.

This is repeated a sufficient amount of time until either all or a sufficient number of areas of the microprocessor array 22 are correlated to positions (of the first member 80 and the second member 88 in both X and Y) of the photovoltaic devices 42-46, 62, 70. If all positions are not specifically used for calibration, the microprocessor 34 can be programmed to extrapolate the ideal positioning of the photovoltaic devices 42-46, 62, 70 that are between the positions actually calibrated.

If the end user is calibrating the solar generator for an electric or a hybrid vehicle 100, it can be set to automatically enter into a calibration mode on power on or, if preferred, input switches can be used for that purpose. The user could simply drive the vehicle around for a predetermined period of time, being instructed to drive up and down hills and make as many turns as possible, perhaps periodically stopping at certain locations for a short time, while the microprocessor 34 sweeps the photovoltaic devices 42-46, 62, 70 as described above, to calibrate the solar generator for an electric or a hybrid vehicle 100.

Additionally, the solar generator for an electric or a hybrid vehicle 100 could remain in "calibration mode" for days if necessary until all or a sufficient number of areas of the phototransistor array 22 have been illuminated to fully calibrate the system.

Accordingly, a fully automatic way of calibrating the solar generator for an electric or a hybrid vehicle 100 is provided that correlates the location of the sun with the positioning of the photovoltaic devices 42-46, 62, 70.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A solar generator panel for an electric or a hybrid vehicle, comprising:
    (a) means for sensing the current position of the sun and including means for aligning at least one photovoltaic device to face toward the sun;
    (b) wherein said means for sensing the current position of the sun includes continually sensing the current position of the sun and wherein said means for aligning includes periodically altering a position of said at least one photovoltaic device to face toward a current location of the sun;
    (c) wherein said means for sensing the current position of the sun and said means for aligning is attached to said vehicle;
    (d) a covering over said at least one photovoltaic device, and wherein said covering is attached relative to said electric or hybrid vehicle, and wherein a position of said covering relative to said vehicle does not change in response to said periodically altering a position of said at least one photovoltaic device;
    (e) wherein means for sensing the current position of the sun includes said covering and wherein said covering includes a dome that is adapted to allow a portion of solar radiation to pass therethrough, and including a phototransistor array that includes a plurality of phototransistors, each of said phototransistors adapted to provide an output when a sufficient quantity of said solar radiation is impinging thereon, and means for directing said solar radiation that passes through said dome to said phototransistor array; and
    (f) wherein said means for directing said solar radiation includes a plurality of fiber optic filaments that are each disposed at a first end thereof over certain of said phototransistors of said phototransistor array and which are each disposed at an opposite end thereof proximate an interior surface of said dome.

2. The solar generator panel for an electric or a hybrid vehicle of claim 1 wherein said at least one photovoltaic device includes a solar cell.

3. The solar generator panel for an electric or a hybrid vehicle of claim 1 wherein said at least one photovoltaic device includes a plurality of solar cells.

4. The solar generator panel for an electric or a hybrid vehicle of claim 1 wherein said at least one photovoltaic device is adapted to convert solar insolation into electricity.

5. The solar generator panel for an electric or a hybrid vehicle of claim 1 wherein said at least one photovoltaic device includes a plurality of photoelectric devices, each of said devices adapted to convert solar insolation into electricity.

6. The solar generator panel for an electric or a hybrid vehicle of claim 1 wherein said at least one photovoltaic device is disposed in a spoiler.

7. The solar generator panel for an electric or a hybrid vehicle of claim 1 wherein a sufficient quantity of said fiber optic filaments are disposed over said phototransistor array to prevent an excessive amount of ambient light from impinging on said phototransistor array and to prevent an excessive amount solar insolation that is not passing through said plurality of fiber optic filaments to impinge on said phototransistor array.

8. The solar generator panel for an electric or a hybrid vehicle of claim 1 wherein said phototransistor array includes a composite input signal that is provided as an output thereof, and wherein said composite input signal is representative of a pattern of incident solar radiation impinging on said phototransistor array, and wherein said composite input signal is provided to a microprocessor and wherein said microprocessor computes an average of said incident solar radiation sufficient to determine said current location of the sun.

9. The solar generator panel for an electric or a hybrid vehicle of claim 8 wherein said microprocessor includes an output signal and wherein said output signal includes said average of said incident solar radiation and including means for periodically altering said position of said at least one photovoltaic device to face toward a current location of the sun in response to said output signal.

10. The solar generator panel for an electric or a hybrid vehicle of claim 9 wherein said means of periodically altering said position in response to said output signal includes providing said output signal to a photovoltaic positional controller, and wherein said photovoltaic positional controller emits a control signal and wherein said control signal includes information sufficient for urging said at least one photovoltaic device to face toward said current location of the sun.

11. The solar generator panel for an electric or a hybrid vehicle of claim 10 wherein said information includes an X axis component and a Y axis component, and wherein when said at least one photovoltaic device is urged into a position that corresponds with said X axis component and said Y axis component, said at least one photovoltaic device is adapted to face toward said current location of the sun.

12. The solar generator panel for an electric or a hybrid vehicle of claim 11 including a first member that is adapted to be urged along said X axis in response to said information and a second member that is adapted to be urged along said Y axis in response to said information and wherein a position of said photovoltaic device along said X axis is controlled by a position of said first member and wherein a position of said photovoltaic device along said Y axis is controlled by a position of said second member.

* * * * *